Figure 1:
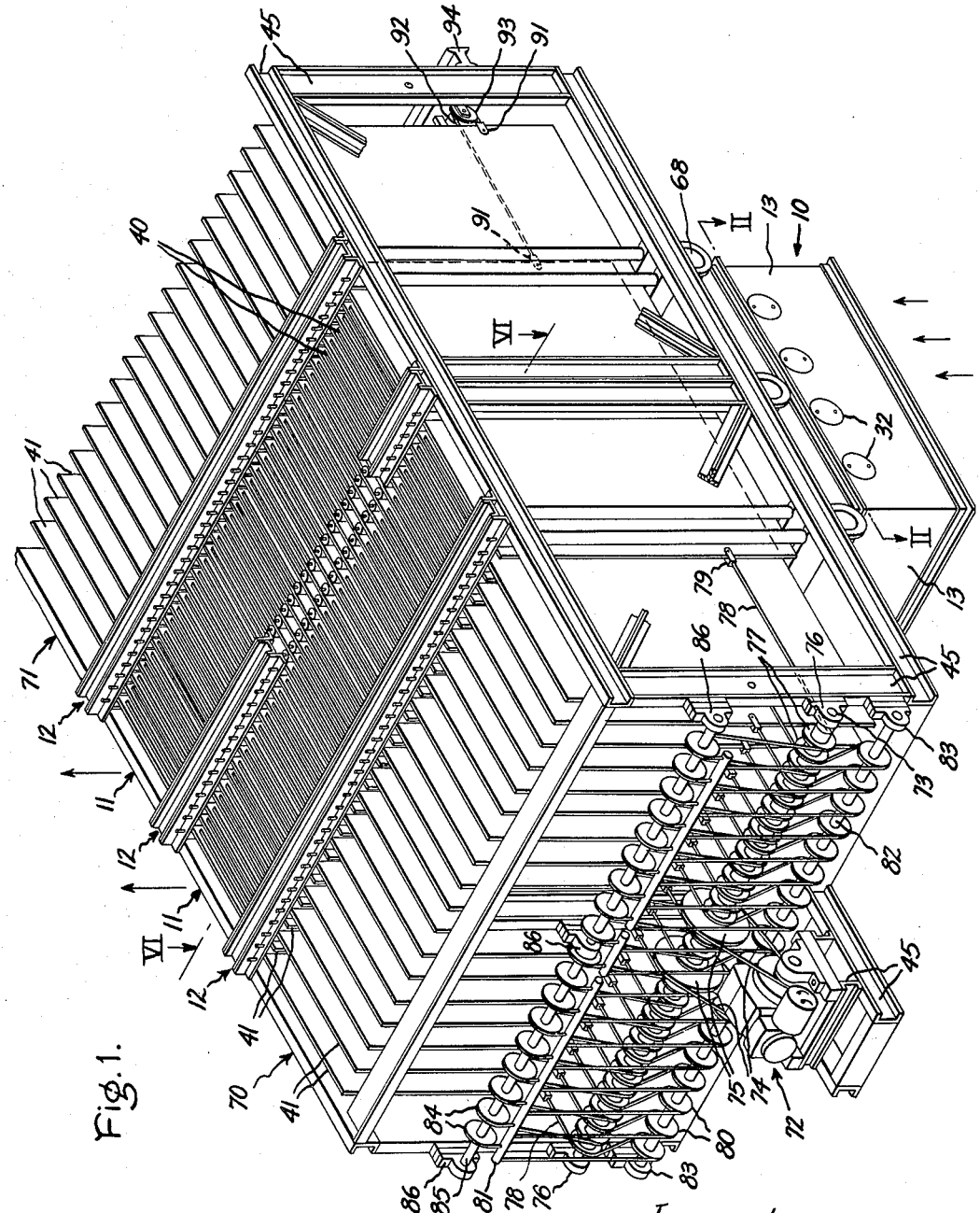
Figure 2:
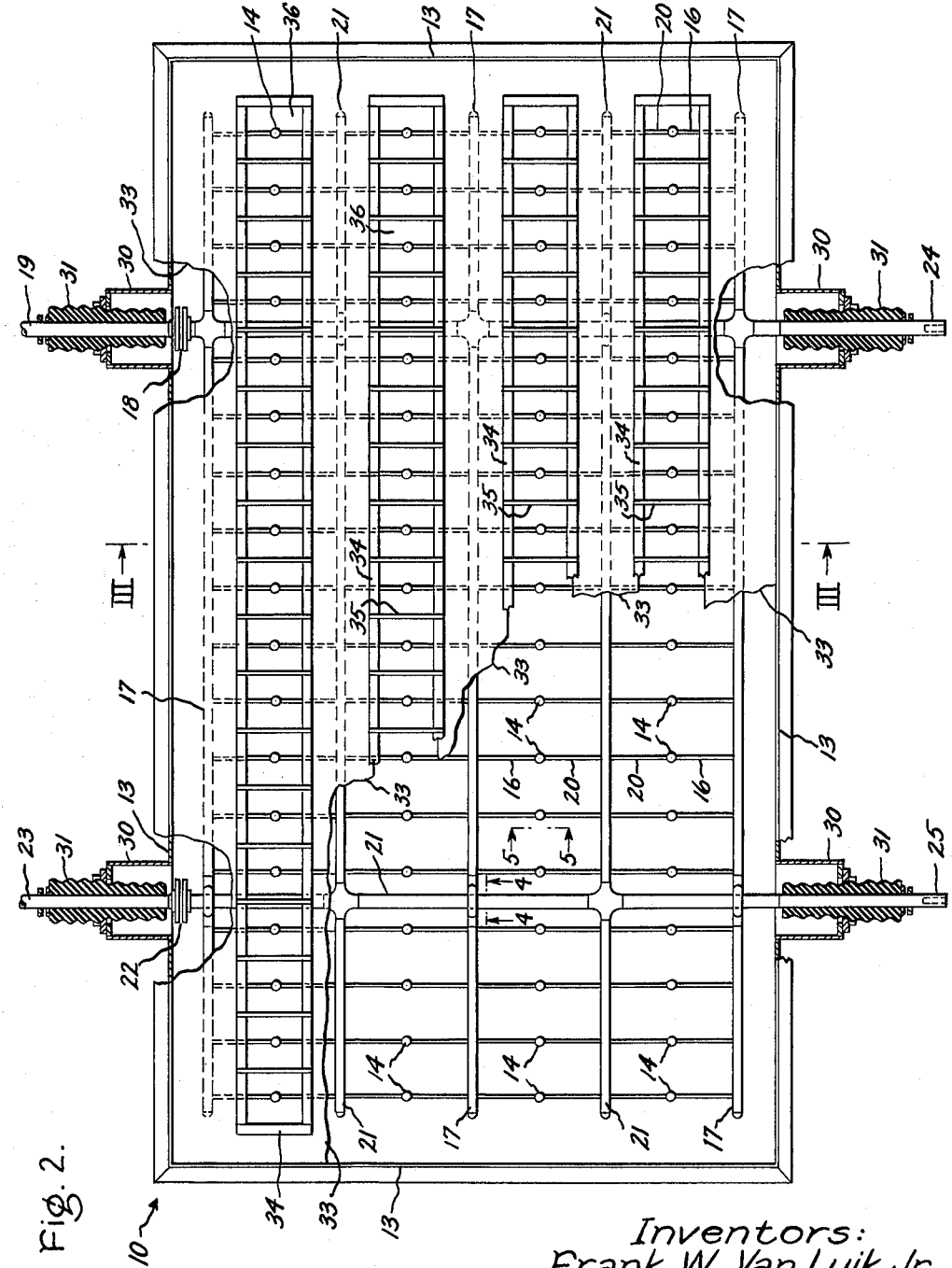

Inventors:
Frank W. Van Luik, Jr.,
Norman H. Wood,
Edward G. Kruszona
by Charles W Helzer
Their Attorney Inventors:
Frank W. Van Luik, Jr.,
Norman H. Wood,
Edward G. Kruszona.
by Charles W Helzer
Their Attorney

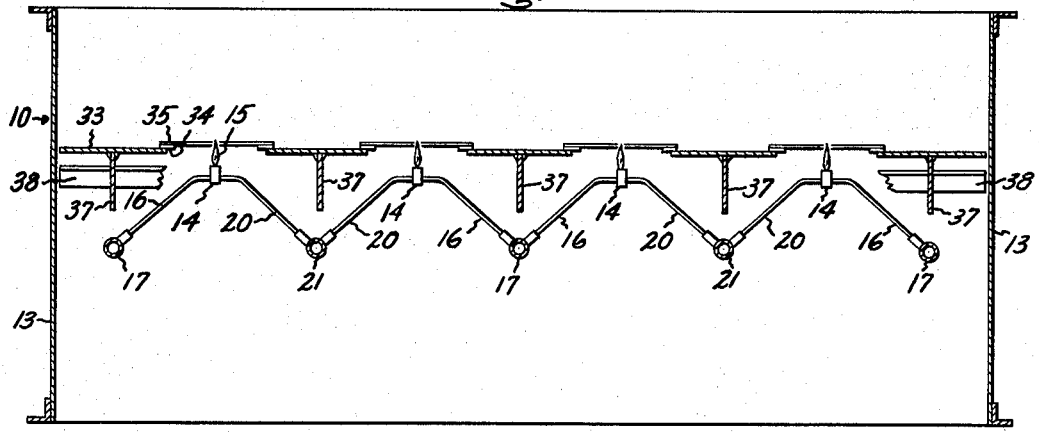
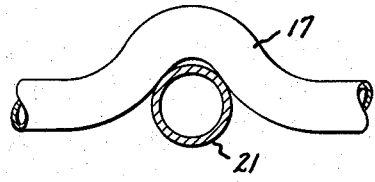
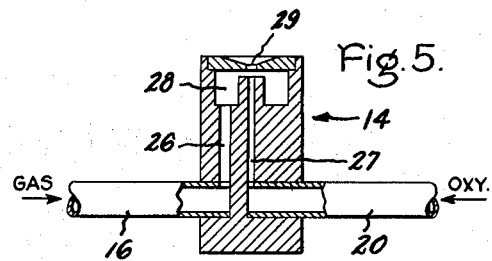
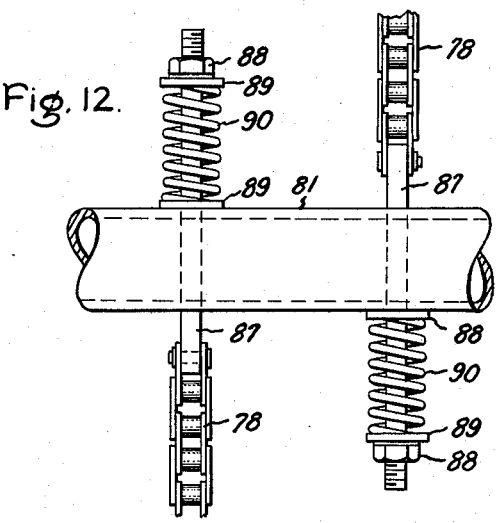

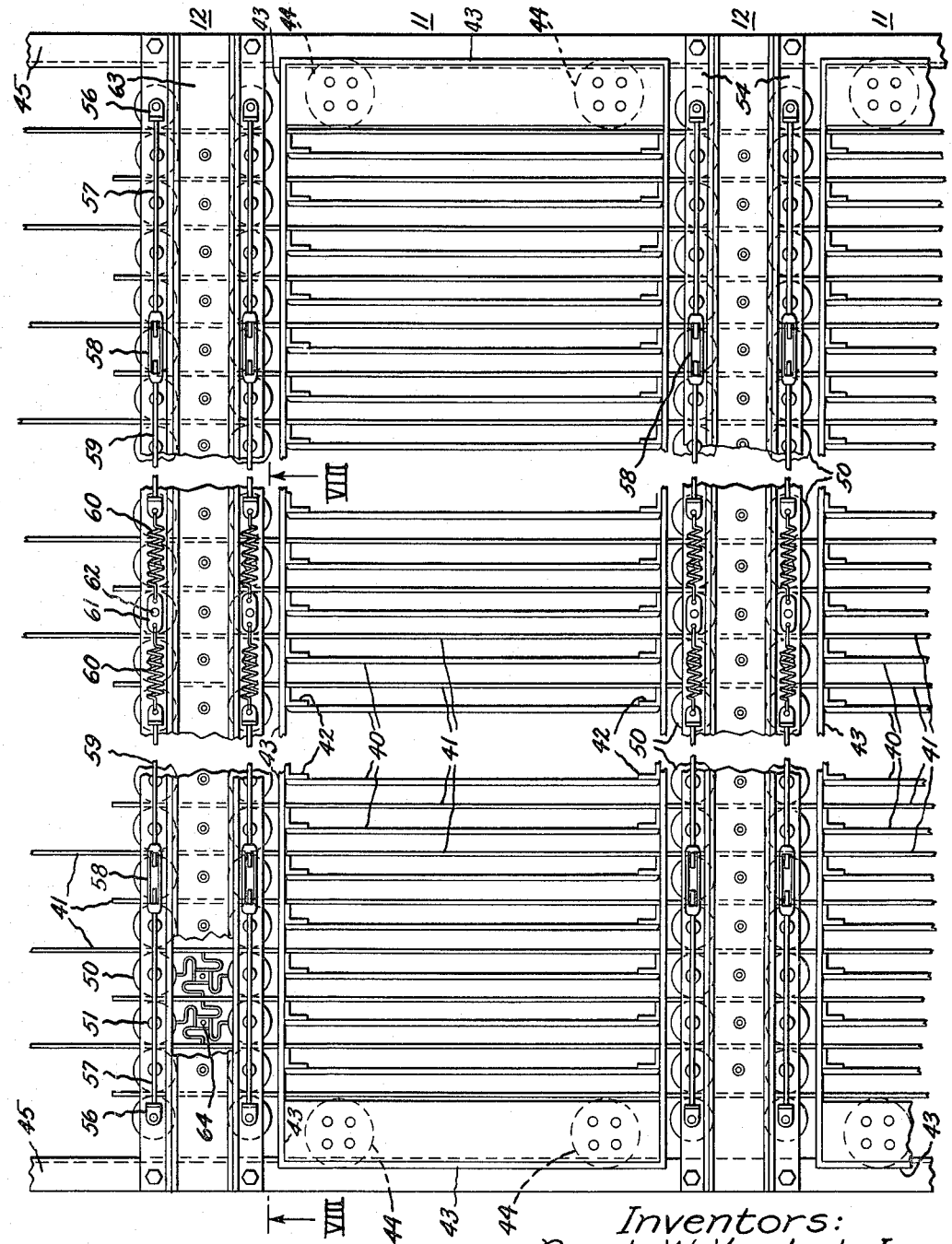

Inventors:
Frank W. Van Luik, Jr.,
Norman H. Wood,
Edward G. Kruszona.
by Charles V Heger
Their Attorney

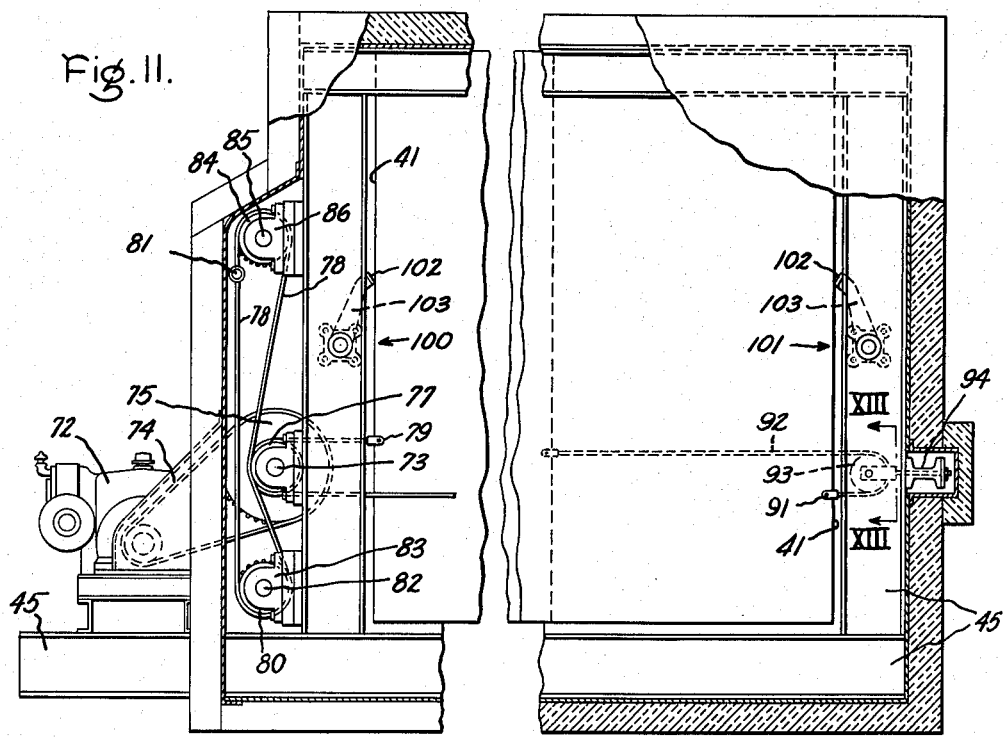
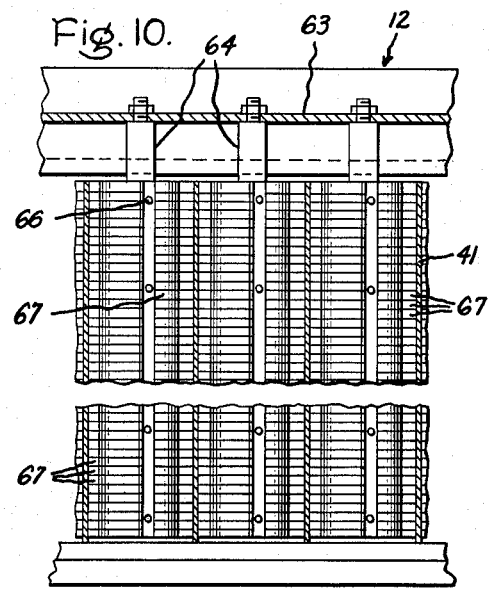
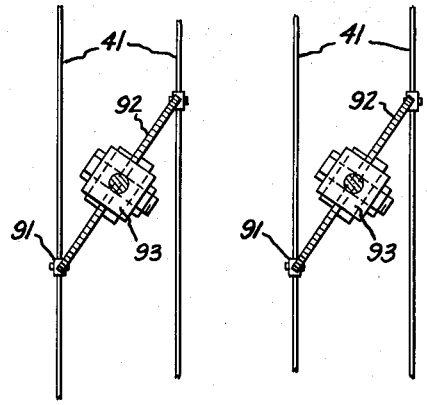

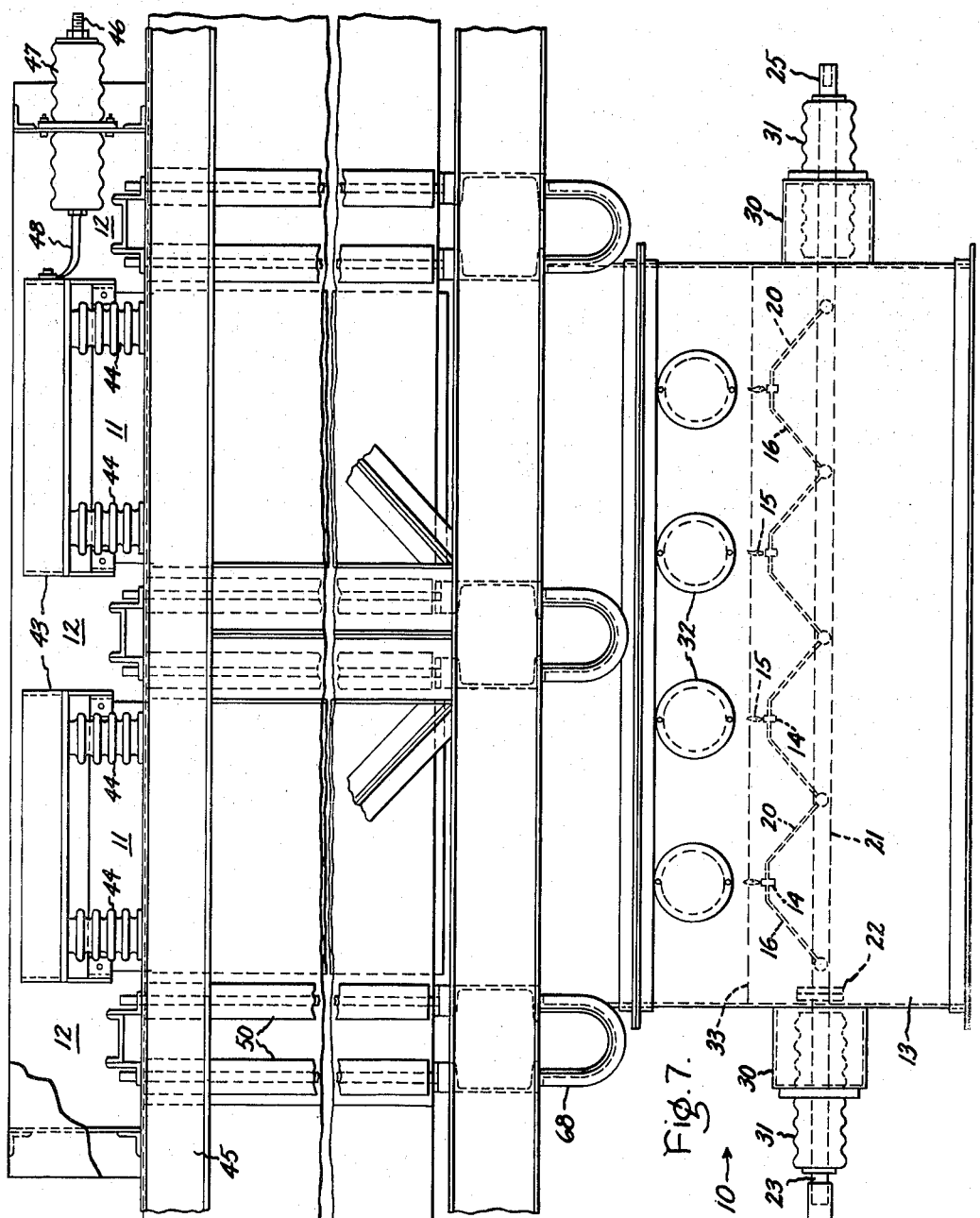

3,250,060
ELECTROSTATIC PRECIPITATOR
Frank W. Van Luik, Jr., Norman H. Wood, and Edward G. Kruszona, Schenectady, N.Y., assignors to General Electric Company, a corporation of New York
Filed Aug. 28, 1963, Ser. No. 305,075
11 Claims. (Cl. 55—114)

The present invention relates to a new and improved electrostatic precipitator for removing minute aerosol particles from an air stream. More particularly, the invention relates to a new and improved particle precipitator which is compact in design, and highly efficient in operation.

Electrostatic precipitators have recently acquired significantly greater importance in industrial facilities because of the problem of increasing air pollution by aerosol particles such as smoke, soot and other debris carried by the gaseous streams exhausted from such facilities. Previously available air cleaning devices for removing such debris have generally been too large in that they require extensive areas in which to perform efficiently the operations of charging the aerosol to be removed, collecting the charged particles, and cleaning the collected debris off of the collecting members and out of the path of the air stream.

A new and improved electrostatic precipitator which does not require a large volume and which avoids the inefficiencies of previously known electrostatic precipitators is disclosed in copending U.S. Patent No. 3,149,936, issued September 22, 1964, Theodore A. Rich inventor, entitled, Electrostatic Precipitator, assigned to the General Electric Company. It is a primary object of the present invention to provide a new and improved electrostatic precipitator which incorporates the novel features of the electrostatic precipitator disclosed in the above-identified Rich Patent No. 3,149,936, and which is relatively compact and highly efficient.

A further object of the present invention is the provision of a new and improved electrostatic precipitator which includes new and improved apparatus for cleaning the areas of precipitation, and for removing the precipitated debris from the precipitator.

Briefly, in accordance with one form of the present invention, an aerosol particle precipitator is provided which comprises a source of ions adapted to be positioned in a fluid stream containing undesired aerosol particles to be removed. The ion source preferably comprises a flame charging source of the type described in the above-referred to copending patent of Theodore A. Rich. As described more completely therein, a flame of combustion creates both positive and negative ions, either of which may be removed from the flame and mixed with the fluid stream by appropriate electric fields. Under the action of diffusion and electric fields, ions from the source will adhere to aerosol particles entrained in a fluid stream passing over the source. In the present precipitator, a baffle structure downstream from the source enhances the mixing of the ions with the stream and increases the probability of collision.

Collection of the charged aerosol particles is performed by a set of shaped collector plates maintained at an appropriate electric potential different from that of the source and shaped to provide for non-turbulent flow of the air stream through the collection area. The collector plates, positioned vertically above the source, are adapted to be reciprocated through narrow cleaning chambers containing scraping means which remove accumulated debirs. Due to the vertical arrangement of the apparatus, the debris will fall into hoppers at the bottom of each chamber from which it may be removed.

A plurality of the cleaning chambers are positioned at horizontal intervals along the collector plates in the path of the fluid stream to divide the cleaning area into a plurality of sections. The collector plates are reciprocated so that the sections on which particles are collected are presented to the scraping means for periodic cleaning. A large number of cleaning chambers may be used with short sections therebetween.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 1 is a perspective view of a view and improved precipitator constructed in accordance with the present invention, and illustrates the precipitator with its outer casing and some elements of internal structure removed;

FIGURE 2 is a horizontal cross sectional view, partially broken away, taken along the line II—II of FIGURE 1;

FIGURE 3 is a vertical cross sectional view taken along the line III—III of FIGURE 2;

FIGURE 4 is a vertical cross sectional view taken along the line IV—IV of FIGURE 2;

FIGURE 5 is a vertical cross sectional view taken along the line V—V of FIGURE 2;

FIGURE 6 is a horizontal cross sectional view taken along the line VI—VI of FIGURE 1;

FIGURE 7 is a vertical side view of the precipitator of FIGURE 1;

FIGURE 8 is a vertical cross sectional view taken along the line VIII—VIII of FIGURE 6;

FIGURE 9 is an enlarged illustration of a portion of FIGURE 6;

FIGURE 10 is a vertical cross sectional view taken along the line X—X of FIGURE 9;

FIGURE 11 is a vertical side view of the precipitattor of FIGURE 1 illustrating the driving mechanism;

FIGURE 12 is an illustration of a portion of the driving mechanism of FIGURE 11;

FIGURE 13 is a vertical cross sectional view taken along the line XIII—XIII of FIGURE 11;

FIGURE 14 which is on the same sheet with FIGURE 7 is a horizontal cross sectional view taken along the line XIV—XIV of FIGURE 8; and FIGURE 15 is a schematic circuit diagram of the circuit which controls the driving mechanism illustrated in FIGURE 11.

*Overall precipitator construction*

Referring specifically to FIGURE 1, the overall operation of the electrostatic precipitator of the present invention comprises introducing an aerosol particle-containing air stream through the bottom of the apparatus illustrated into charging area 10 wherein an appropriate network of flame-sustaining members is disposed. Electric potentials are applied between the members and structure downstream from the members so that ions of a desired polarity are removed from the flame and mixed with the air stream to collide with the adhere to aerosol particles therein. The air stream enters the precipitating area which may comprise any desired number of precipitating sections 11 separated by enclosed cleaning chambers 12. Electric fields in the precipitating sections 11 cause deposition of charged aerosol particles on appropriate collector plates which are reciprocated through the cleaning chambers 12 wherein the accumulated debris is removed. The air stream exhausts from the top of the apparatus illustrated in FIGURE 1 and may be released into the atmosphere or used for any desired purposes.

*Flame charging apparatus*

The apparatus of the present invention will best be understood by considering successively each of the steps performed by the apparatus of FIGURE 1. With regard to the step of charging aerosol particles in a stream, the portion of FIGURE 1 indicated generally by 10 is more clearly illustrated in FIGURES 2–5. The charging apparatus comprises walls 13 which enclose an array of flame-sustaining members or flame tubes 14. The flame tubes 14 are adapted to sustain combustion flames 15 (best seen in FIGURE 3) thereon whereby ions are produced in the high temperature zone of the flame in the manner disclosed in the above-identified Rich patent. This phenomenon has previously been described and defined in the literature.

A combustible gas for maintaining the flames 15 is introduced to flame tubes 14 through a matrix of gas connecting pipes 16 and gas supply pipes 17, supplied through a gas coupling member 18 and gas inlet pipe 19 from an appropriate gas source (not shown). Oxygen is supplied through a similarly arranged matrix of oxygen elements, namely, oxygen connecting pipes 20 connected to the flame tubes 14 and oxygen supply pipes 21 supplied through an oxygen coupling member 22 and oxygen inlet pipe 23 from an appropriate oxygen source (not shown.) Gas and oxygen may be supplied through as many such inlet pipes as may be required to maintain the desired pressures throughout the system. The oxygen and gas supplies are, of course, kept distinct until mixing occurs in flame tubes 14. In order that the matrix of gas supply pipes 17 and the oxygen supply pipes 21 be arrayed in a planar arrangement, an elbow is provided in one of the pipes at their intersections in the manner illustrated in FIGURE 4 wherein gas supply pipe 17 is bent to pass over oxygen supply pipe 21.

The entire system of connecting pipes 16, 20, supply pipes 17, 21 and flame tubes 14 is composed of an appropriate electrically conductive material such as stainless steel. The system is supported by and electrically insulated from the surrounding walls 13 by supporting members 30 and ceramic insulators 31. An appropriate energizing potential may be supplied to the flames, as illustrated in FIGURE 2, through a pair of solid high voltage connectors 24 and 25 which are attached directly to the supply pipes 17 and 21, respectively. Thus, the flame tubes 14 and the matrix of supply pipes may be connected to an appropriate potential, either positive or negative, so that ions of the same polarity generated in the flames 15 will be repelled, and will move toward a region of different potential. In accordance with the present invention, the different potential, preferably ground for reasons of safety, is applied to the collecting structure in sections 11 (FIGURE 1) to attract charged aerosol particles and remove them from the air stream.

As shown in FIGURE 5, the flame tubes 14 each include appropriate internal conduits 26 and 27, a swirl chamber 28 and a nozzle 29 whereby the oxygen and gas are mixed. The mixture of oxygen and gas exits through the nozzle 29 where it ignites and burns to provide flames 15. The flames 15 are initially ignited by insertion of appropriate igniton means through ports 32, shown in FIGURE 1.

A significant improvement in the number of aerosol particles charged by collision and adherence of ions can be made by utilizing a baffle structure such as that shown in FIGURES 2 and 3 for mixing the ions produced by flames 15 with the air stream. This structure is maintained at a potential of the same polarity as the collecting structure in sections 11. The baffle structure comprises an electrically conductive baffle plate 33 having an appropriate number of elongated apertures or slots formed therein which are oriented above each row of flame tubes 14. The plate must be thick to resist bending under the pressure of the air stream, but, it has been found that better mixing is obtained if the edges of the apertures above the flame tubes 14 are defined by relatively thin members. Therefore, elongated thin strips 34 of electrically conductive material, are placed to overlie the edge of the apertures in plate 33 and are attached thereto. Cross members 35, also comprising thin strips of electrically conductive material, are attached to members 34 to define an aperture 36 above each flame tube 14. Vertical ribs 37, extending the length of plate 33 to support its weight and prevent sagging, are mounted at each end to walls 13 by an angle iron 38. The ribs 37, the angle irons 38, and the walls 13 are composed of an electrically conductive material and are preferably maintained at the potential of the collecting structure, namely ground.

The baffle 33 defines, with respect to each flame tube 14, a limited area through which the air stream must pass and further defines the lines of force of the electric field established by the potential difference between flame tubes 14 and plate 33. As a result, ions emitted from the flames 15 will either cross the air stream with a high probability of collision with aerosol particles, or will travel parallel to the air stream for an extended distance thereby increasing the probability of mixing and colliding with aerosol particles by means of diffusion. In general, the effect of the baffle structure is to greatly increase the number of aerosol particles which are charged by ions from the flames.

*Precipitating section*

The net result of the apparatus contained in area 10 is the charging of a very high percentage of the aerosol particles entrained in the gaseous stream passing through the apparatus with ions produced by flames 15. The next step to be performed by the apparatus is that of precipitating the charged particles out of the gaseous stream. This is accomplished in the precipitating sections 11, disposed above charging area 10, which will now be described in connection with FIGURES 1, 6 and 7. The precipitating sections 11, a side view of which is shown in FIGURE 6, may be as wide or as narrow as desired, although it is preferable that all sections be of equal width. There may be as many sections as desired, since several sections will be more efficient and the precipitating area may be as wide as is required by the application. Each section 11 includes a series of fixed electrode plates 40 alternated with movable collector plates 41, the collector plates extending through all sections and being of a width one section wider than the total width of all the precipitating sections 11 as will be more completely described below. The electrode plates 40 are attached by means of angle clips 42 to a frame 43 and the frame 43 is mounted on an appropriate number of standoff insulators 44. The insulators 44 rest on precipitator frame members 45 (best seen in FIGURE 7) which support the various elements of the apparatus. The electrode plates 40 are composed of an electrically conductive material such as steel, and angle clips 42 and frame 43 are also of electrically conductive material. By this means, an electric potential applied to frame 43 by means such as conductor 46, introduced through ceramic insulator 47 and lead 48 will be distributed to all of the electrode plates 40.

In order to decrease turbulence adjacent the electrode plates, they may be fabricated to have a cross section which is a maximum at the top of the section 11 and which tapers to a minimum at the bottom. The taper need only be slight, for example, the thickness may vary from one-sixteenth inch at the bottom to three-sixteenths inch at the top over a five-foot length. However, it has been found that shaping the electrode plates in this manner maintains the gaseous medium flowing past the plates in a non-turbulent flow condition, and greatly increases the efficiency of the percipitator as described more fully in the above referred to Rich Patent No. 3,149,936. To avoid the possibility of sparkover, the bottom edge of electrode plates 40 may be rounded, thereby avoiding a sharp point from which a spark might start.

The collector plates 41 which extend across the precipitating sections 11 are composed of an electrically conductive material and are connected electrically to the same potential, preferably ground, as the baffle structure. Ions which pass through the baffle structure will move along electrostatic lines of force which are nearly parallel to the flowlines of the air stream and which terminate on the collector plates 41. Due to the distance over which the lines of force and the flowlines are nearly parallel, ions and aerosol particles will mix by diffusion and nearly all of the aerosol particles which escape charging near the baffle structure will be charged by collision and adherence of ions traveling to the collector plates. An electric potential is applied to the electrode plates 40 and the electric field established between collector plates 41 and electrode plates 40 will result in the precipitation on collector plates 41 of charged aerosol particles passing therebetween. Although the values of potentials can be varied, it is necessary that the electrode plates 40 be of the same polarity as the flame tubes 14, and that both be of opposite polarity from the collector plates 41 so that ions emitted from the flames 15 will be repelled by the electrode plates and attracted to the collector plates. The baffle structure should also be of a polarity to attract ions emitted from the flames, but it should not me more attractive than the collector plates. A similar precipitation occurs in each of the precipitating sections 11 and therefore, due to the high efficiency of the apparatus described, the air stream leaving the top of the precipitator will be almost completely free of the aerosol particules previously entrained.

*Cleaning section*

The apparatus in cleaning chambers 12 for removing accumulated debris from collector plates 41 will now be described. The collector plates 41 are reciprocally driven across the air column so that each section of the collector plates which is exposed to precipitation of particles is moved through one cleaning chamber 12. The apparatus in cleaning chambers 12 will be best understood by a consideration of FIGURES 6–10.

Figure 8:
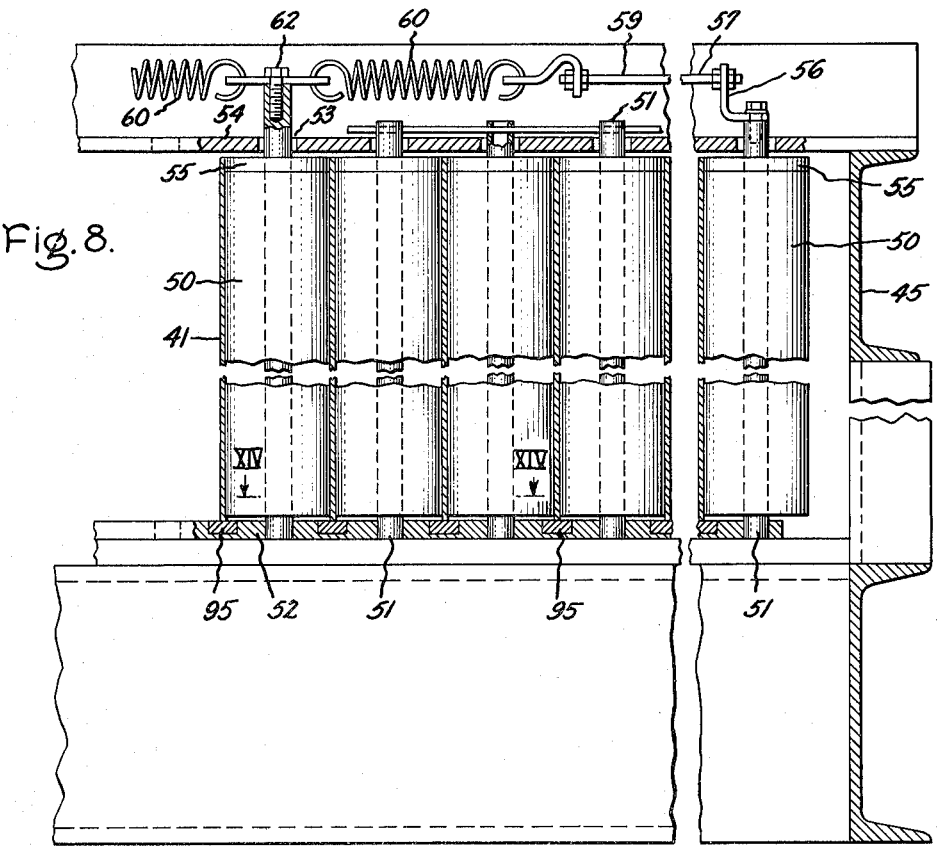
Figure 9:
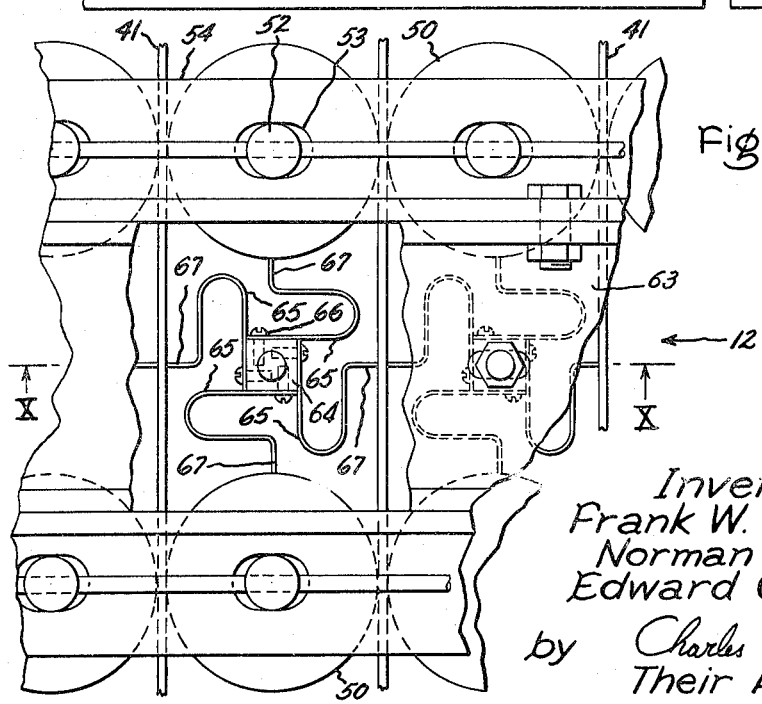

Cleaning chambers 12 include a plurality of rollers 50 mounted on each side of the chamber as shown in FIGURE 6. The rollers 50 define the cleaning chambers and are designed to roll at the same surface velocity as the collector plates 41 so that there is no scraping action thereby preventing re-entrainment of debris from collector plates 41 back into the air stream being filtered. Additionally, the rollers 50 serve to seal off the cleaning chambers from the precipitating sections thereby further preventing any re-entrainment of the debris cleaned off in the cleaning chambers back into the air stream. For this purpose, the rollers 50 are rotatably supported along each side of the chambers 12, and the collector plates 41 pass between them, as illustrated in FIGS. 6 and 9. The roller shafts 51 are journalled in appropriate bearings 52 at the base of the chamber, and at the top of the chamber, and the roller shafts 51 extend through apertures 53 in a bar 54 that is bolted to frame member 45. The apertures in the bar 54 are slightly larger than the shafts as illustrated in FIGURES 8 and 9, and a collar 55 mounted at the top of each roller rides against the surface of two of the collector plates 41. Each segment of the cleaning chambers 12 is defined by one pair of the rollers 50 and the respective rollers of the pairs are disposed in rows which extend across the full length of the precipitating region. The end rollers in each row are interconnected by angle clips 56, rods 57, turnbuckles 58, rods 59, and springs 60. The springs 60 are then connected to the axle of the center roller by means of strip 61 and bolt 62. By proper adjustment of the turnbuckles 58, the collars 55 are pressed firmly against the surface of collector plates 41, thereby restricting the space between collector plates 41 and rollers 50 to the thickness of collars 55 which may be approximately $\frac{1}{32}''$. This allows collected debris to enter the cleaning chamber on plates 41.

Cover plates 63 are disposed over the tops of cleaning chambers 12 and a square support member or rod 64 (best shown in FIGURE 9) depends therefrom into each cleaning chamber segment between the defining pair of rollers and each pair of plates. A scraper 65 is mounted on each side of the square rod 64 by suitable fastening means such as screws 66. Each scraper 65 comprises a strip of metal, for example, phosphor bronze, which extends parallel to the axis of the rollers and which has been bent into the configuration shown in FIGURE 9. The scrapers are attached along one edge to support member 64, and are formed to provide a plurality of sets of horizontal fingers 67 which are arranged side by side along the length of the roller as illustrated in FIGURE 10. The scrapers are so sized that the tips of the fingers 67 are perpendicular to and engage the surfaces of the adjacent collector plates 41 and the surfaces of the rollers 50. The bend in scrapers 65 is adjusted so that the fingers 67 engage the various surfaces with sufficient pressure to remove any accumulated material precipitated on collector plates 41 or collected by rollers 50 without damaging the surfaces.

Under the force of gravity, debris removed by fingers 67 from collector plates 41 and rollers 50, will fall into the enclosed hoppers 68 at the base of each cleaning chamber as illustrated in FIGURE 7. The debris may then readily be removed from hoppers 68 by any appropriate means. A preferred removal means is a vacuum system since this creates a pressure differential across the openings between chambers 12 and sections 11 and reduces the possibility of re-entrainment of particles.

*Reciprocating mechanism*

The mechanism by which the collector plates 41 are reciprocated will now be described. This may best be understood by a consideration of FIGURES 1, 6 and 11–14. As previously stated, and as shown in FIGURE 1, the collector plates 41 extend throughout the width of the total precipitating area, including all precipitating sections 11 and cleaning chambers 12. Additionally, each collector plate 41 extends beyond this region by a distance equal to the width of the widest precipitating section. FIGURE 1 illustrates the preferred embodiment wherein all sections 11 are equal in width and the collector plates are one section wider than the air stream.

Alternate collector plates 41 are positioned so that the additional width extends into areas at opposite sides of the precipitating area. The purpose of this additional width is to allow the plates to be reciprocated through the precipitating area while at the same time maintaining a given surface area in each section for precipitation. Thus, the plates which are initially in the area indicated at 70 in FIGURE 1 and extend to the beginning of area 71 may be moved a distance equal to the width of the widest section to the right in FIGURE 1, and all surfaces will have passed through one cleaning chamber 12, but a portion of the collector plate having a given collecting surface area will always be in collecting position in all of the precipitating sections 11. Similarly, the alternate collector plates 41 which initially extend into area 71 and terminate adjacent area 70 may be moved to the left in FIGURE 1 so that all sections of the plates pass through one cleaning chamber 12, and a portion of the collector plate having a given collecting surface area will always be in collecting position in all of the sections 11.

The driving mechanism to accomplish the above result is comprised by a motor 72 shown in FIGURES 1 and 11, and a system of drive chains and sprockets associated therewith. Motor 72 is mounted on frame members 45, and drives shaft 73 through drive chains 74 and sprockets 75. Shaft 73 is supported on frame members 45 by journals 77, and has a plurality of sprockets 77 mounted along its length, the total number of sprockets being equal to the number of plates 41. A drive chain 78 is connected to each plate 41 by means of a connector 79, and each extends respectively over an associated sprocket 77. In the case of one of the alternate collector plates in the set which initially extend into area 70 for example, the drive chain 78 extends over the top of the respective associated sprocket 77, under an idler sprocket 80 for reversing direction of the chain, and up to one side of a pipe 81. The sprockets 80 are mounted on shaft 82 which is journalled in bearings 83 likewise secured to the lower frame members 45. In the case of the remaining collector plates 41, that is, those which initially extend into area 71, the respective drive chains 78 extend under the respective sprockets 77, over idler pulleys 84 and downwardly to a connection to the remaining side of the pipe 81. The idler pulleys 84 are supported on a shaft 85 journalled in bearings 86 secured to the upper frame members 45. The connection of the respective drive chains 78 to the pipe 81 is illustrated in FIGURE 12, the connection of all the chains being identical except for orientation. Each chain is connected to a threaded rod 87 which extends through the pipe 81 and a shock absorbing assembly, comprising spring 88, is supported over the end of the rod 87 extending through pipe 81 by washers 89 and nut 90. By reason of this construction, the spring 88 will cushion initial movement and stopping of the plates 41 by their respective drive chains 78.

In order to provide a balanced load on the drive motor 72, alternate pairs of collector plates 41 are attached at their opposite ends by means of connectors 91 to drive chains 92 so that the set of plates which is being moved by motor 72 into area 70 will pull the alternate set of plates into area 71. The drive chains 92 are connected over reversing idler pulleys 93 which are supported by I-beam 94 attached to frame members 45. The idler pulleys 93 are set at angle with respect to the collector members 41 as illustrated in FIGURE 13 to facilitate interconnection between the adjacent plate 41.

The collector plates 41 are supported on blocks of bearing material, illustrated at 95 in FIGURE 14, for example a phenolic asbestos compound such as that designated R–860, manufactured and sold by the Raybestos Manhattan Company. The material selected should be long wearing and have a low coefficient of friction so that the plates slide easily over it. The bearing material is mounted in the frame of the apparatus adjacent the supports 48 for roller shafts 47.

During operation of the precipitator as the motor drives sprockets 75, the pipes 81 are reciprocated, ensuring uniform motion of all collector plates 41. As a result of reciprocation of pipes 81, half of the plates 41 are moved from a position of extension into area 71 into a position of extension into area 70 by the drive chains 78 while the other half of plates are moved oppositely by drive chains 92. Alternately, the reverse relation is brought about by continued reciprocation of pipes 81 by the drive motor 72. This reciprocation of pipes 81 may be either periodic or continuous depending upon the necessity for cleaning plates 41. Connecting each collector plate 41 to a drive sprocket 77 and, through a chain 92, to the adjacent collector plate prevents any one collector plate from being critical to the movement of the remainder, since it is not desirable that one broken chain cause all of the plates to stop. In the system as decribed above, a maximum of two plates will stop reciprocating if one chain breaks.

Figure 15:
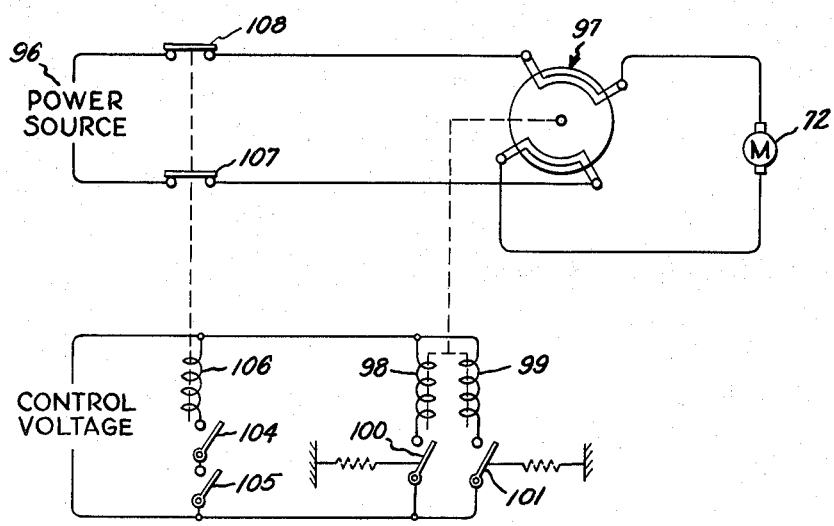

FIGURE 15 illustrates the circuit used to control motor 72 which reciprocates the collector plates 41. The motor 72 is connected to a power source 96 through reversing switch 97 which is controlled by the coils 98 and 99. The coils are energized from an appropriate source of control voltage through switches 100 and 101, both of which are spring-biased open. Due to the parallel connection, closure of either of switches 100 or 101 will cause switch 97 to be rotated 90°, thus reversing the connection of motor 72 across its power source and reversing its direction of rotation. Switches 100 and 101, also shown in FIGURE 11, are rotary switches actuated by plates 41 through a horizontal bar 102 and arm 103. Arrival of either set of collector plates, or of any one plate at the end of its path will actuate one of the swiches 100 or 101 to reverse motor 72.

To prevent burnout in case of the failure of the switching mechanism illustrated above, overrun protection switches 104 and 105, shown in FIGURE 15, may be provided to energize coil 106 and open switches 107 and 108, thereby stopping motor 72. In the arrangement shown, overrun must occur on both sides of the precipitator before the motor will be shut off.

*Overall operation*

In operation, it will be understood from the preceding description that upon appropriate fuel being supplied to flame tubes 14 and flames 15, and after being initially ignited, the flames will be sustained thereby. A high voltage is applied to the flame tube 14, for example through the network of fuel supply pipes, and the housing of the precipitator is connected to a different potential, preferably ground. Through the medium of the mechanical connections of electrically conductive materials, baffle plate 33 and the associated baffle structure and collector plates 41 will be at the same potential as the housing. The electrode plates 40 are connected through conductor 46 to a potential of the same polarity as the flame tubes 14. One example of suitable working potentials for the arrangement is 20,000 volts consisting of an equality of potential applied to the electrode plates 40, and 5,000 volts of the same polarity applied to the flame tubes 14, although it should be understood that these values are merely representative, and other values will work equally well.

A fluid stream, for example air, bearing aerosol particules is directed upwardly into charging area 10 wherein ions emitted from flames 15 by virtue of the established electric fields will collide with and adhere to the aerosol particles. The baffle structure assures nearly complete charging of the entrained aerosol particles. The air stream then enters the collecting area precipitating sections 11 wherein the electric fields set up by the respective potentials on electrode plates 40 and collector plates 41 will cause the charged aerosol particles to be collected on the collector plates 41. The clean fluid stream will then exhaust through the top of the precipitator. Concurrently with the above-described collecting action, the collector plates 41 are slowly and continuously reciprocated through cleaning areas 12 by motor 72 and the above-described driving connections, the cleaning chambers being defined by the rollers 50. Within the cleaning chambers, the fingers 67 of scrapers 65 rub against the collector plates 41 and rollers 50 to remove precipitated particles. The particles, due to the force of gravity, fall into hoppers 68 from which accumulated debris may be removed by vacuum means or in any appropriate manner.

An important feature of the present invention lies in the small cleaning chambers described above. The narrow cleaning chambers 12 and the scraping means contained therein are highly efficient in removing precipitated particles from the collector plates. Since an extended cleaning area is not required, cleaning chambers 12 may be disposed at desired intervals across the air column, and the successive precipitating sections may be relatively narrow. Thus, the plates need only be reciprocated through a small distance to achieve complete cleaning. This allows for compactness of design without impairment of the collector plate cleaning operation. Additionally, the design allows the rollers 50 to effectively seal off the cleaning chambers 12 from the precipitating sections thereby avoiding any re-entrainment of the debris back into the air stream.

Two significant advantages result from the above compactness of design feature. First, the areas 70 and 71 into which the collector plates extend during alternate cycles need only equal the width of one section rather than the width of the entire precipitating area. For example, if ten precipitating sections one foot in width were provided, the overall apparatus would only have to be about twelve feet wide to accommodate the collector plates in areas 70 and 71 instead of 30 feet as is required by previous electrostatic precipitators. The total width, rather than being three times the width of the precipitating area, is only two sections greater than the precipitating area. This results in a savings in the cost of materials for constructing the device as well as in economy of space at the eventual location of the precipitator.

The second advantage resulting from the close spacing of narrow cleaning chambers 12 is the higher frequency with which the areas of the collector plates are cleaned for a given plate speed. Due to the size and weight of the collector plates, it is more feasible and practical to move them at a relatively low rate of speed. In prior precipitators, where any given area passed through the entire precipitating column before being cleaned, a relatively high rate of speed had to be maintained or else a buildup of precipiated particles occurred which decreased the efficiency of the precipitator. In the case of the present apparatus, the plates may be moved at a low rate of speed and each area will still be frequently cleaned due to the short distance between chambers 12.

Another important feature of the above described apparatus lies in the use of scrapers 65 divided into fingers 67. Since the fingers formed a nearly continuous removal edge, the entire surface of the collector plates will be scraped and cleaned. The light spring tensioning of the fingers 67, provided by the curved shape of the scraper 65 and of the initial portion of the fingers 67, ensures sufficient pressure against the collector plates to remove all precipitated particles. The fingers 67 are used rather than a continuous scraping edge to maintain contact which might be lost if an area of a continuous edge became bent. Such a bend could remove an extended portion of the scraping means from contact whereas the fingers 67 would be individually bent and would not cause extended loss of scraping contact.

Another significant feature of the invention is the vertical arrangement of the collector electrode plates 40, 41 over the air stream to be cleaned thereby reducing the pressure drop through the system and allowing the collected particles to be removed more efficiently.

From the foregoing description, it can be appreciated that the present invention provides a new and improved electrostatic precipitator which is smaller and more highly efficient than previously known precipitators. It is, therefore, to be understood that other modifications and variations of the invention are possible in the light of the above teachings. Hence, changes may be made in the particular embodiment of the invention described which are within the full intended scope of the invention as defined by the appended claims.

What we claim as new and desire to secure by Letters Patent of the United States is:

1. An aerosol particle precipitator comprising:
   (a) a source of electrically charged particles for imparting an electric charge to aerosol particles entrained in a fluid stream;
   (b) collecting means positioned downstream from said source and comprising a plurality of spaced generally parallel movable collector plates maintained at a predetermined electric potential different from that of said source;
   (c) a plurality of cleaning chambers extending transversely to and intermediate adjacent ones of said movable collector plates and containing means for removing precipitated particles from each said adjacent collector plates;

(d) roller means positioned on each side of each cleaning chamber and engaging the collector plates on each side thereof for sealing off the cleaning chambers to prevent reentrainment of particles cleaned from the collecting plates back into the fluid stream being cleaned, said cleaning chambers and associated roller means being positioned at intervals along said collector plates and dividing said collector plates into a plurality of sections whereby said collector plates need be moved only a distance equal to the spacing between successive cleaning chambers to effect complete cleaning of said collector plates; and (e) means for moving said collector plates.

2. An aerosol particle precipitator as recited in claim 1, wherein said source of electrically charged particles comprises:

(a) an array of flame-sustaining members;

(b) a network of supply pipes for providing fuel to said flame-sustaining members, said supply pipes and said members being maintained at a predetermined electric potential; and (c) baffle means spaced from said array of flame-sustaining members and maintained at an electric potential different from the electric potential of said flame sustaining members.

3. An aerosol particle precipitator as recited in claim 1, wherein said collecting means further comprises:

(a) a plurality of electrode plates interleaved with and substantially parallel to said collector plates;

(b) said alternate electrode plates being slightly tapered outwardly toward the downstream side to provide non-turbulent flow of air through the collector plates; and (c) said electrode plates being maintained at an electric potential of the same polarity as that of said source.

4. An aerosol particle precipitator comprising:

(a) a source of electrically charged particles comprising a flame-sustaining member positioned in a fluid stream and maintained at a predetermined electric potential;

(b) collecting means positioned downstream from said source and comprising a plurality of spaced generally parallel movable vertical collector plates maintained at a predetermined electric potential different from that of said source;

(c) a plurality of vertically disposed cleaning chambers extending the full width of and intermediate adjacent ones of said movable collector plates and containing scraping means for removing precipitated particles from each said adjacent collector plates;

(d) roller means positioned on each side of each cleaning chamber and engaging the collector plates on each side thereof for sealing off the cleaning chambers to prevent reentrainment of particles cleaned from the collecting plates back into the fluid stream being cleaned, said cleaning chambers and associated roller means being positioned at intervals along said collector plates and dividing said collector plates into a plurality of sections whereby said plates need be moved only a distance equal to the spacing between successive cleaning chambers to effect complete cleaning of said collector plates; and (e) means for horizontally moving said collector plates.

5. An aerosol particle precipitator as recited in claim 4 wherein a hopper is positioned at the bottom of each of said cleaning chambers for collecting particles removed from said collector plates.

6. An aerosol particle precipitator as recited in claim 4 wherein each of said scraping means comprises an elongated assembly having at least two rows of individual fingers extending therefrom in opposite directions, each of said assemblies being positioned between adjacent collector plates, said fingers engaging an elemental width on said collector plates with each row of fingers providing a continuous scraping edge extending the full distance along one dimension of the collector plates to remove precipitated particles therefrom.

7. An aerosol particle precipitator as recited in claim 4 wherein each of said scraping means comprises an elongated support member and at least two elongated strips, each of said support members being positioned between adjacent collector plates, each of said strips being attached to said support member along one edge and being cut transversely along the opposite edge to provide a plurality of individual extended fingers in a continuous row, each of said fingers being bent in the form of a U-shaped tension spring to provide tension which causes each of said fingers individually to engage a discrete elemental width of said collector plates.

8. The aerosol particle precipitator as recited in claim 4 wherein each of the scraping means comprises four rows of individual extended fingers mounted adjacent one another to provide a continuous scraping edge extending the full distance along one dimension of the collector plates and associated roller means of each cleaning chamber, the scraping means thus comprised being mounted in each of said cleaning chambers for engaging the collector plates and roller means to remove precipitated particles therefrom.

9. In an aerosol particle precipitator as set forth in claim 4 wherein said scraping means comprises an elongated assembly positioned between successive collector plates and their associated roller means in each cleaning station, said assembly having a central support member and four elongated strips, each of said strips being attached to said support member along one edge and being cut at the opposite edge to provide a plurality of fingers arrayed in a continuous row with each of said fingers being bent in the form of a U-shaped tension spring to provide tension which causes each of said fingers individually to engage a discrete elemental width of the collector plates and roller means for removing precipitated particles therefrom.

10. The aerosol particle precipitator set forth in claim 4 wherein said collecting means further comprises:
   (a) a plurality of vertical electrode plates interleaved with and spaced substantially parallel to said vertical collector plates, and maintained at an electric potential having the same polarity as said source; and
   (b) said alternate vertical electrode plates being slightly tapered outwardly towards the downstream end to provide non-turbulent flow of air through the collector plates.

11. The aerosol particle precipitator set forth in claim 4 wherein said source of electrically charged particles comprises:
   (a) an array of flame-sustaining members;
   (b) a network of supply pipes for providing fuel to said flame-sustaining members, said supply pipes and said flame-sustaining members being maintained at a predetermined electric potential; and
   (c) a baffle means spaced from said array of flame-sustaining members and maintained at an electric potential different from the electric potential of said flame-sustaining members; and wherein said collecting means further comprises;
   (d) a plurality of vertical electrode plates interleaved with and spaced substantially parallel to said vertical collector plates; and maintained at an electric potential having the same polarity as said source; and
   (e) said alternate vertical electrode plates being slightly tapered outwardly towards the downstream end to provide non-turbulent flow of air through the collector plates; and wherein each of said scraping means comprises:
   (f) an elongated assembly having at least two rows of individual fingers extending therefrom in opposite directions, each of said assemblies being positioned between adjacent collector plates with said fingers engaging an elemental width on said collector plates with each row of fingers providing a continuous scraping edge extending the full distance along one dimension of the collector plates to remove precipitated particles therefrom.

References Cited by the Examiner

UNITED STATES PATENTS

| 986,118 | 3/1911 | Alexander | 55—290 X |
| 3,149,936 | 9/1964 | Rich | 55—114 |

FOREIGN PATENTS

| 435,574 | 3/1927 | Germany. |
| 359,686 | 3/1962 | Switzerland. |

OTHER REFERENCES

German printed application No. 1,078,096, March 1960.

ROBERT F. BURNETT, *Primary Examiner.*